United States Patent
Habben

(10) Patent No.: US 8,544,205 B2
(45) Date of Patent: *Oct. 1, 2013

(54) METHODS TO INCREASE YIELD OF PLANTS GROWN AT HIGH POPULATIONS

(75) Inventor: Jeffrey E Habben, Urbandale, IA (US)

(73) Assignee: Pioneer Hi Bred International Inc, Johnston, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,033

(22) Filed: Jul. 31, 2012

(65) Prior Publication Data

US 2012/0291347 A1 Nov. 22, 2012

Related U.S. Application Data

(63) Continuation of application No. 12/852,598, filed on Aug. 9, 2010, now Pat. No. 8,250,807.

(60) Provisional application No. 61/232,812, filed on Aug. 11, 2009.

(51) Int. Cl.
*A01G 1/00* (2006.01)

(52) U.S. Cl.
USPC .................... 47/58.1 FV; 47/58.1 SE; 47/1.43

(58) Field of Classification Search
USPC .................. 47/1.43, 58.1 R, 58.1 SE, 58.1 FV
See application file for complete search history.

(56) References Cited

U.S. PATENT DOCUMENTS

| | | | | |
|---|---|---|---|---|
| 4,069,614 A | * | 1/1978 | Hicks et al. | 47/58.1 R |
| 5,518,989 A | * | 5/1996 | Martin et al. | 504/116.1 |
| 6,115,672 A | * | 9/2000 | Caveny et al. | 702/19 |
| 6,162,974 A | * | 12/2000 | Martin et al. | 800/320.1 |

OTHER PUBLICATIONS

Thomison et al., "Defoliation Affects Grain Yield, Protein, and Oil of TopCross High-Oil Corn," Plnat Management Network, available at http://www.plantmanagementnetwork.org/pub/cm/research/2003/topeross (2003).*

* cited by examiner

*Primary Examiner* — Rob Swiatek
*Assistant Examiner* — Lisa Tsang
(74) *Attorney, Agent, or Firm* — Pioneer Hi Bred Int'l Inc.

(57) ABSTRACT

An increase in the total grain and biomass yields and photosynthetic rates of plants grown at high densities achieved by novel methods of defoliating the primary-source leaf of a majority of such plants. In particular the methods provide for increased grain and biomass yields, including for example, increased average kernel mass for maize plants, and photosynthetic rates through the timely removal of the primary-source leaf of a majority of the plants grown at high densities. This invention also relates to seeds obtained by using the disclosed methods.

20 Claims, 2 Drawing Sheets

METHODS TO INCREASE YIELD OF PLANTS GROWN AT HIGH POPULATIONS

CROSS-REFERENCE TO RELATED APPLICATIONS

This application is a continuation of U.S. patent application Ser. No. 12/852,598 filed Aug. 9, 2010, now U.S. Pat. No. 8,250,807, issued on Aug. 28, 2012 which claims the benefit of U.S. Provisional Patent Application No. 61/232,812, filed Aug. 11, 2009, both of which are hereby incorporated herein in their entirety by reference.

FIELD OF THE INVENTION

This invention relates to methods to increase total grain yield and biomass yield of plants grown at high densities, involving the removal of the primary-source leaves of a majority of the plants. The invention also relates to increasing the photosynthetic rates of plants grown at high densities by the removal of the primary-source leaves of a majority of the plants. In maize plants, the removal of the ear-leaf during a specific period after pollination results in increased grain and biomass yields, average kernel mass and photosynthetic rates of maize plants grown at high densities. This invention also relates to seeds obtained by using the disclosed methods.

BACKGROUND OF THE INVENTION

A general carbohydrate partitioning principle in maize holds that photoassimilate moves preferentially from a leaf to the nearest metabolically active tissue (i.e., source to sink). Edmeades, et al., (1979) *Can J. Plant Sci.* 59:577-584. Thus, of various leaves, the ear-leaf supplies the greatest percentage of assimilate to the developing ear of the plant.

It is also well understood that canopy formation is a critical process in crop development, as it sets the stage for successful seed set and seed filling. The importance of solar radiation capture to yield in plants, including maize, is well established. In the United States Cornbelt, plant populations have consistently increased over the past 50 years. See, e.g., Iowa State University: Corn Planting Guide (September 2001). As plant populations increase, the ear-leaf receives less incident solar radiation and radiation which is of reduced quality, due to the development of the canopy. As a result, at high plant populations, the primary source leaf for developing ears is situated in an inferior light environment. Egharevba, et al., demonstrated that the ear-leaf of plants grown at high densities receives decreased quantity and a reduced quality of solar radiation due to its position in the canopy wherein light transmission is decreased. Egharevba, et al., Proc. of Physiol. Prog. Formulation Workshop IITA, 18-20, 1975.

There is also a documented photosynthetic compensatory response to defoliation in maize. Allison, et al., (1966) *Ann. Bot. N.S.* 30:365-381. Increased photosynthetic rates have also been demonstrated in response to partial defoliation of rangeland plants, where remaining leaves demonstrate a compensatory increase in photosynthetic rates. Briske, et al., (1995) Wildland plants: physiological ecology and developmental morphology, 635-710. It is hypothesized that the compensatory increase in photosynthetic rates is an evolved survival mechanism against grazing by herbivores.

Interestingly, the literature available generally reports detrimental effects of defoliation on maize yields. See, e.g., Hicks, et al., (1977) *Agronomy J.* 69:387; Tollenaar, et al., (1978) *Can. J. Plant Sci.* 58:207; Crookston, et al., (1978) *Crop Sci.* 18:485; Johnson, (1978) *Agronomy J.* 70:995 and Hunter, et al., (1991) *Crop Sci.* 31:1309. There is literature recognizing the ability of total defoliation to improve aspects of maize seed quality, but seed size is reduced. U.S. Pat. No. 6,162,974. Additionally, Crookston, et al., reported that defoliation can enhance yield in short-season maize hybrids if leaf removal occurred at a very early growth stage, prior to flowering. However, leaf removal during silking consistently led to a reduction in maximum yield.

The general estimated percentage of maize grain yield loss as a result of defoliation has been studied at various growth stages. National Crop Insurance Services (Rev. 1984). See, Table 1. The growth stages in Table 1 were determined by counting leaves using the leaf over method, counting a leaf if it has emerged from the whorl and the leaf tip is starting to arch over.

Commercial data suggest that plant population densities can be increased to generate increased plant yields due to improved plant genetics and germplasm, biotechnology traits in seeds, seeding rates and plant placement. However, such studies typically test densities ranging from 23,000 to 43,000 seeds per acre and demonstrate a drop-off of increased yields above 38,000 seeds per acre. The testing of various seeding rates (seeds per acre) is not equivalent to the lower number representing the final stand or actual number of plants reaching maturity. Accordingly, the results represent actual plant density less than the referenced 23,000 to 43,000 seeds per acre.

These references do not show or address, however, the impact of defoliating in high density planting of crops. Accordingly, the development of defoliation methods to produce an unexpected increase in grain yield, average kernel mass and biomass yield would enable a variety of commercial uses. Increased grain yield is particularly important for fields planted at increased populations for purposes of inbred production. Increased kernel biomass production and biomass yield are particularly important and useful for generating increased dry mass for a variety of commercial purposes. Further, an increase of photosynthetic rates of plants further enhances the ability of such plants to produce such increased yields and kernel biomass for the same variety of commercial purposes. Further, planting in areas of increased plant density is also desirable to enable growers to greatly exceed industry standard limitations on density of planting in fields. Still further, the methods of increasing yields, kernel and biomass are also likely desirable for plants under drought stress, where a yield increase is hypothesized to result from a decrease in leaf surface area requiring ground water.

TABLE 1

| Growth Stage | % Leaf Defoliation | | | | | | | | | | | | | | | | | | |
|---|---|---|---|---|---|---|---|---|---|---|---|---|---|---|---|---|---|---|---|
| | 10 | 15 | 20 | 25 | 30 | 35 | 40 | 45 | 50 | 55 | 60 | 65 | 70 | 75 | 80 | 85 | 90 | 95 | 100 |
| | | | | | | | | | % Yield Loss | | | | | | | | | | |
| 7 leaf | 0 | 0 | 0 | 0 | 0 | 0 | 1 | 1 | 2 | 3 | 4 | 4 | 5 | 5 | 6 | 7 | 8 | 9 | 9 |
| 8 leaf | 0 | 0 | 0 | 0 | 0 | 1 | 1 | 2 | 3 | 4 | 5 | 5 | 6 | 6 | 7 | 8 | 9 | 10 | 11 |

TABLE 1-continued

| Growth Stage | % Leaf Defoliation | | | | | | | | | | | | | | | | | | |
|---|---|---|---|---|---|---|---|---|---|---|---|---|---|---|---|---|---|---|---|
| | 10 | 15 | 20 | 25 | 30 | 35 | 40 | 45 | 50 | 55 | 60 | 65 | 70 | 75 | 80 | 85 | 90 | 95 | 100 |
| | % Yield Loss | | | | | | | | | | | | | | | | | | |
| 9 leaf | 0 | 0 | 0 | 1 | 1 | 2 | 2 | 3 | 4 | 5 | 6 | 6 | 7 | 7 | 9 | 10 | 11 | 12 | 13 |
| 10 leaf | 0 | 0 | 0 | 1 | 2 | 3 | 4 | 5 | 6 | 7 | 8 | 8 | 9 | 9 | 11 | 13 | 14 | 15 | 16 |
| 11 leaf | 0 | 0 | 1 | 1 | 2 | 3 | 5 | 6 | 7 | 8 | 9 | 10 | 11 | 12 | 14 | 16 | 18 | 20 | 22 |
| 12 leaf | 0 | 0 | 1 | 2 | 3 | 4 | 5 | 7 | 9 | 10 | 11 | 13 | 15 | 16 | 18 | 20 | 23 | 26 | 28 |
| 13 leaf | 0 | 1 | 1 | 2 | 3 | 4 | 6 | 8 | 10 | 11 | 13 | 15 | 17 | 19 | 22 | 25 | 28 | 31 | 34 |
| 14 leaf | 0 | 1 | 2 | 3 | 4 | 6 | 8 | 10 | 13 | 15 | 17 | 20 | 22 | 25 | 28 | 32 | 36 | 40 | 44 |
| 15 leaf | 1 | 1 | 2 | 3 | 5 | 7 | 9 | 12 | 15 | 17 | 20 | 23 | 26 | 30 | 34 | 38 | 42 | 46 | 51 |
| 16 leaf | 1 | 2 | 3 | 4 | 6 | 8 | 11 | 14 | 18 | 20 | 23 | 27 | 31 | 36 | 40 | 44 | 49 | 55 | 61 |
| 17 leaf | 2 | 3 | 4 | 5 | 7 | 9 | 13 | 17 | 21 | 24 | 28 | 32 | 37 | 43 | 48 | 53 | 59 | 65 | 72 |
| 18 leaf | 2 | 3 | 5 | 7 | 9 | 11 | 15 | 19 | 24 | 28 | 33 | 38 | 44 | 50 | 56 | 62 | 69 | 76 | 84 |
| 19-21 leaf | 3 | 4 | 6 | 8 | 11 | 14 | 18 | 22 | 27 | 32 | 38 | 43 | 51 | 57 | 64 | 71 | 79 | 87 | 96 |
| Tassel | 3 | 5 | 7 | 9 | 13 | 17 | 21 | 26 | 31 | 36 | 42 | 48 | 55 | 62 | 68 | 75 | 83 | 91 | 100 |
| Silked | 3 | 5 | 7 | 9 | 12 | 16 | 20 | 24 | 29 | 34 | 39 | 45 | 51 | 58 | 65 | 72 | 80 | 88 | 97 |
| Silks brown | 2 | 4 | 6 | 8 | 11 | 15 | 18 | 22 | 27 | 31 | 36 | 41 | 47 | 54 | 60 | 66 | 74 | 81 | 90 |
| Pre-blister | 2 | 3 | 5 | 7 | 10 | 13 | 16 | 20 | 24 | 28 | 32 | 37 | 43 | 49 | 54 | 60 | 66 | 73 | 81 |
| Blister | 2 | 3 | 5 | 7 | 10 | 13 | 16 | 19 | 22 | 26 | 30 | 34 | 39 | 45 | 50 | 55 | 60 | 66 | 73 |
| Early milk | 2 | 3 | 4 | 6 | 8 | 11 | 14 | 17 | 20 | 24 | 28 | 32 | 36 | 41 | 45 | 50 | 55 | 60 | 66 |
| Milk | 1 | 2 | 3 | 5 | 7 | 9 | 12 | 15 | 18 | 21 | 24 | 28 | 32 | 37 | 41 | 45 | 49 | 54 | 59 |
| Late milk | 1 | 2 | 3 | 4 | 6 | 8 | 10 | 12 | 15 | 18 | 21 | 24 | 28 | 32 | 35 | 38 | 2 | 46 | 50 |
| Soft dough | 1 | 1 | 2 | 2 | 4 | 6 | 8 | 10 | 12 | 14 | 17 | 20 | 23 | 26 | 29 | 32 | 35 | 38 | 41 |
| Early dent | 0 | 0 | 1 | 1 | 2 | 3 | 5 | 7 | 9 | 11 | 13 | 15 | 18 | 21 | 23 | 25 | 27 | 29 | 32 |
| Dent | 0 | 0 | 0 | 1 | 2 | 3 | 4 | 6 | 7 | 8 | 10 | 12 | 14 | 15 | 17 | 19 | 20 | 21 | 23 |
| Late dent | 0 | 0 | 0 | 0 | 1 | 2 | 3 | 4 | 5 | 6 | 7 | 8 | 9 | 10 | 11 | 12 | 13 | 14 | 15 |
| Nearly mature | 0 | 0 | 0 | 0 | 0 | 0 | 0 | 0 | 1 | 2 | 3 | 4 | 5 | 5 | 6 | 6 | 7 | 7 | 8 |
| Mature | 0 | 0 | 0 | 0 | 0 | 0 | 0 | 0 | 0 | 0 | 0 | 0 | 0 | 0 | 0 | 0 | 0 | 0 | 0 |

Commercial data suggest that plant population densities can be increased to generate increased plant yields due to improved plant genetics and germplasm, biotechnology traits in seeds, seeding rates and plant placement. However, such studies typically test densities ranging from 23,000 to 43,000 seeds per acre and demonstrate a drop-off of increased yields above 38,000 seeds per acre. The testing of various seeding rates (seeds per acre) is not equivalent to the lower number representing the final stand or actual number of plants reaching maturity. Accordingly, the results represent actual plant density less than the referenced 23,000 to 43,000 seeds per acre.

These references do not show or address, however, the impact of defoliating in high density planting of crops. Accordingly, the development of defoliation methods to produce an unexpected increase in grain yield, average kernel mass and biomass yield would enable a variety of commercial uses. Increased grain yield is particularly important for fields planted at increased populations for purposes of inbred production. Increased kernel biomass production and biomass yield are particularly important and useful for generating increased dry mass for a variety of commercial purposes. Further, an increase of photosynthetic rates of plants further enhances the ability of such plants to produce such increased yields and kernel biomass for the same variety of commercial purposes. Further, planting in areas of increased plant density is also desirable to enable growers to greatly exceed industry standard limitations on density of planting in fields. Still further, the methods of increasing yields, kernel and biomass are also likely desirable for plants under drought stress, where a yield increase is hypothesized to result from a decrease in leaf surface area requiring ground water.

SUMMARY OF THE INVENTION

The present invention provides methods of increasing grain yields beyond standard yields when crop plants are propagated at high plant densities. The methods involve growing a plurality of plants at a high density and then removing at least one ear-leaf from a majority of maize plants after pollination. The methods can further involve harvesting grain from one or more of the plurality of plants grown at the high density.

The present invention further provides methods of increasing biomass yields, particularly grain biomass yields, through the increase of average seed or kernel mass. Thus, the invention also provides methods of increasing average seed or kernel mass. The methods involve growing a plurality of plants at a high density and then removing at least one ear-leaf from a majority of maize plants after pollination. The methods can further involve harvesting grain from one or more of the plurality of plants grown at the high density. The grain produced by the methods of the invention has an increased average mass or weight per seed or kernel, when compared to grain harvested from a plurality of intact plants (i.e., no leaves intentional removed) grown at the same high density.

The invention provides methods of increasing the photosynthetic rates of plants grown at plant high densities. The methods involve growing a plurality of plants at a high density and then removing at least one ear-leaf from a majority of maize plants after pollination. The remaining source leaves display higher photosynthetic rates when compared to the sources leaves on intact plants grown at the same high density.

The foregoing and other aspects of the invention will become more apparent from the following detailed description.

DETAILED DESCRIPTION OF THE INVENTION

Figure 1:
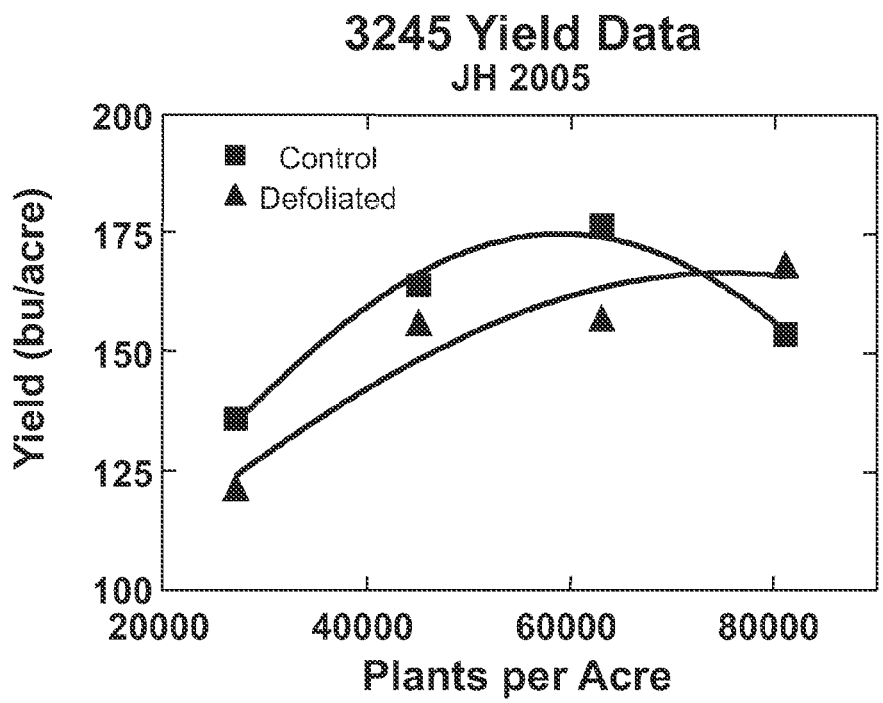
FIG. 1 shows grain yields of ear-leaf-defoliated maize plants and grain yields of intact control plants across a range of plant populations.

The embodiments of this invention are not limited to particular methods of ear-leaf defoliation, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural references unless the context clearly indicates otherwise. By way of example, "an element" means one or more elements. Further, all units, prefixes, and symbols may be denoted in their SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation; the preferred materials and methods are described herein. In describing and claiming the embodiments of the present invention, the headings provided are not limitations on the embodiments of the invention and the following terminology will be used in accordance with the definitions set out below.

The term "defoliate" in this application means the removal or destruction of one or more plant leaves, particularly the ear-leaf in maize (Zea mays) plants in one embodiment of the invention. Defoliation can be performed by a variety of methods, including for example, manual, mechanical, automated or chemical (such as herbicidal formulations) defoliation. The application of chemicals as a method of defoliation may include one or more herbicidal formulations. See e.g., U.S. Pat. No. 6,162,974 identifying exemplary herbicidal formulations for chemical defoliation. Preferred herbicides include herbicides that (1) are characterized by a low residual toxicity, (2) are not translocated (i.e., not systemic) and (3) are effective as defoliants in a variety of environmental conditions. Such methods are readily available and known to those skilled in the art to which the invention pertains.

The term "ear-leaf" means the leaf that is attached to the same node as the ear. A maize plant may have more than one ear and thus more than one ear-leaf. Accordingly, the methods of the present invention involve the defoliation of at least one ear-leaf from each of a majority of maize plants grown at high densities. The number of ear-leaves may differ as a result of growth densities and other factors. For example, as population densities increase, maize plants are less likely to have multiple ear-leaves.

By "majority" of plants is intended more than 50% of the plants of a plurality of plants or in a population of plants. Thus, a majority of plants includes, for example, 51%, 52%, 53%, 54%, 55%, 60%, 65%, 70%, 75%, 80%, 85%, 90%, 95%, 96%, 97%, 98%, 99%, or 100% of the plants of a plurality of plants or in a population of plants.

For purposes of the invention, the ear-leaf is not intended to be a limiting description of the type of leaf defoliated from plants utilized according to the invention. The methods of the present invention may be utilized in numerous plants, in addition to maize, through the defoliation of the leaf (or leaves) nearest to the sink in such plant. Accordingly, the term "primary-source leaf" shall mean the leaf that is attached nearest to the sink. For example, plants of similar anatomy to maize may be utilized according to the methods of the invention, including without limitation, monocots such as grasses, including wheat, rice, oats, millet, barley, rye and sorghum. The primary-source leaf refers to the leaf nearest to the sink; for example, as applicable to the cereal grain wheat, the flag leaf is the primary-source leaf. According to the invention, the term "primary-source leaf" shall encompass such equivalent plant leaves as the "ear-leaf" in maize.

Examples of plant species of interest include, but are not limited to, corn (Zea mays), rice (Oryza sativa), rye (Secale cereale), sorghum (Sorghum bicolor, Sorghum vulgare), millet (e.g., pearl millet (Pennisetum glaucum), proso millet (Panicum miliaceum), foxtail millet (Setaria italica), finger millet (Eleusine coracana), wheat (e.g., Triticum aestivum, Triticum turgidum Triticum monococcum), sugarcane (Saccharum spp.), oats (Avena sativa), barley (Hordeum vulgare), triticale (x Triticosecale) and teff (Eragrostis tet).

The term "high density" means exceeding about twice the standard plant population for a given environment. For example, a high density of plant growth in a climate with poor soil will differ from a high density of plant growth in optimum soils. According to the methods of one embodiment of the present invention, defoliation of a maize plant's ear-leaf results in increased yields, plant biomass, average seed or kernel mass and photosynthetic rates of the plants grown at high densities. A standard (non-high density) maize plant population is approximately 30,000 plants per acre for the Cornbelt in the United States and is equivalent to 75,000 plants per hectare. Plants grown in higher densities greatly exceed such standard plant densities. For example, high density includes plants grown at least at 70,000 plants per acre.

Plant populations constituting "high density" will further differ according to the plant species utilizing the methods of the invention. Additionally, the quantification of "high density" may vary according to the type of canopy structure of a plant, leaf structures (i.e., flat, planofile leaves) affecting radiation capture, leaf size and width, erectness and other variations.

Typically, the methods disclosed herein involve the growing of plants outdoors in agricultural fields using standard cultural practices for the plant of interest. In such agricultural fields, plants are typically grown in rows with a uniform spacing between the two or more rows in a field. To achieve the high density plant populations of the present invention in such an agricultural field comprising plants in rows, the number of plants per row can be increased, or the number of rows per unit area can be increased or both the number of plants per row and the number of rows per unit area can be increased. For example, to increase the number of rows per unit area the distance between the two or more rows can be reduced. Cultural practices such as, for example, twin rows that are spaced close together (e.g., 12 inches) and then separated from the adjacent set of twin rows by greater (e.g., 30 inches) can also be employed to achieve high density plant populations of the present invention. The invention, however, does not depend on a particular planting method or row spacing to achieve the high density plant population.

Additionally, the geographic location of the plant populations may impact the levels of plant growth constituting high density; for example, plants grown in the eastern Cornbelt of the United States on average receive less radiation than plants grown in the western portion of the Cornbelt. Such a geographic factor affecting the levels of radiation received by a plant's canopy will further impact the densities at which such plants may be grown. For example, it is believed that plants grown in such areas that receive decreased amounts of radiation would acquire "high density" status at a lower absolute population than those plants grown in areas receiving more radiation.

The term "pollination" means the process of transferring pollen in and/or between plants in order to effect fertilization. According to a preferred embodiment of the invention, defoliation occurs approximately 10 days after pollination.

The term "yield" means generally the amount of end product, such as the harvested portion of the crop of interest, including for example, maize kernels (i.e., seed) or grain produced using the methods set forth in the present invention. Thus, in some embodiments of the invention, yield is grain yield. In other embodiments of the invention, yield can be total biomass. In yet other embodiments, yield can be silage.

There is little known or documented about methods of defoliation to increase plant yields and biomass. Rather, conventional studies and literature provide findings related to the generally expected decrease in yields as a result of defoliation. See, e.g., Subedi, et al., (2005) *Crop Sci.* 45:2246-2247. Subedi, et al., teach that removal of the ear-leaf of maize plants results in a significant reduction of yield, as measured by dry matter, and both kernel number and mass. However, the present invention provides methods to achieve the unexpected result of increased plant grain yields and increased biomass yields in plants grown in higher densities through methods of defoliating the primary-source leaf of a majority of such plants after pollination. Additionally, the methods may further be utilized to achieve the unexpected result of increased average kernel mass in defoliated maize plants grown in higher densities.

Unless noted otherwise or apparent from the context of usage herein, a "control" or "control plant" is a plant that has not been defoliated but is otherwise the same as the defoliated plant and is subjected to the same environmental conditions as the defoliated plant including, but not limited to, plant density per unit area. Preferably, the control plant is the same species as the plant that has been defoliated by methods of the present invention. More preferably, the control plant is genetically identical to (i.e., has the same genotype as) the defoliated plant.

A. Increased Grain Yields

According to one embodiment of the invention, removing the primary-source leaf of plants growing at high density results in an unexpected increase in total grain yields in comparison to yields achieved in plants with an intact primary-source leaf grown in the same high density. This resultant increase in grain yields after defoliation is contrary to the general principle that defoliating a plant results in a negative effect on yield. The benefit of increased grain yields after defoliation is realized at high densities, as defined herein. For example, defoliated maize plants grown at densities of above approximately 70,000 plants per acre demonstrate an increase in grain yield over non-defoliated maize plants; however, trends toward improvement of grain yield in ear-leaf-defoliated maize plants over control plants occur at the inflection point of between 70,000 to 80,000 plants per acre. (FIG. 1).

It is believed that the increased grain yields generated from the methods of the present invention are a result of the timely removal of the primary-source leaf, for example an ear-leaf that results in directing the ear to obtain photoassimilate from other leaves in the canopy. The result of the redirection of photoassimilate is such that more photoassimilate is obtained from other leaves in the canopy, preferably those in the upper part of the plant that are the youngest and that are situated in an environment of superior light quantity and quality.

Advantageously, methods of the invention may be used to increase and enhance yield of grain production through the removal of the primary-source leaves of a majority of the plants at a precise time after pollination. In a preferred embodiment the defoliation of plants to remove the primary-source leaf occurs after pollination, when the sink effect is expected to be strong. After pollination, for example, maize plants have established kernel set and become strong sinks for photoassimilate. In the event of defoliation of maize plants, if defoliation occurs before or at anthesis, the growth and development of maize kernels would be impaired. Thus, the ear-leaf of the of the maize plants can be removed at 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35 or more days after pollination. Preferably, the defoliation of maize plants to remove the ear-leaf occurs approximately 10 days after pollination, in order to ensure the kernel numbers of the defoliated maize plants are unaffected and that kernel mass is positively affected by the ear-leaf removal. Defoliation of the ear-leaves of a majority of the plants should not occur significantly later than about 30 days after pollination, to ensure that kernel mass is not compromised by such defoliation. Therefore, the defoliation of the plants to remove the ear-leaf should preferably occur within about 10 days to about 30 days after pollination, such as, for example, about 10, 11, 12, 13, 14, 15, 16, 17, 18, 19, 20, 21, 22, 23, 24, 25, 26, 27, 28, 29 or 30 days after pollination.

While the present invention is not bound by any particular biological mechanism, it is believed that the timely defoliation of the primary-source leaf promotes the repartitioning effect within the plant. The beneficial effect is believed to result in enhanced export of assimilates from upper canopy leaves (i.e., leaves in a preferred light environment) to the developing grain, such as kernels for maize plants. Since there is a strong sink with missing primary source leaves, the ears may emit a signal triggering a repartitioning effect such that assimilate from upper canopy leaves in the better light environment is exported down to developing kernels, allowing them to fill to a greater extent than those on control plants, whose primary source leaf is in an inferior light environment. Accordingly, it is believed the methods of the invention result in exportation of assimilate in defoliated plants that promotes the filling of kernels to a greater extent than those of intact control plants.

B. Increased Kernel Mass

In another embodiment of the invention, removing the ear-leaf of maize plants growing at high densities results in increased average kernel mass in comparison to average kernel mass achieved in maize plants with an intact ear-leaf. In the defoliated plants of the present invention, there is no observed change in seed or kernel set relative to intact control plants. However, the weight of the seeds or kernels or is increased in order to create increased grain and biomass yields of the defoliated plants. Such unexpected results of increased average seed or kernel mass as a result of the present invention are contradictory to expected grain and biomass yield results. It is unexpected that the removal of ear-leaves, causing a decrease in the plant's above-ground biomass, would result in overall increased biomass and grain yields as a result of increased kernel mass.

The methods of the invention are used to increase and enhance biomass through crop production generating increased kernel mass as a result of the removal of the ear-leaf of maize plants at a precise time after pollination. For example, the ear-leaf of the of the maize plants can be removed at 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35 or more days after pollination.

While the present invention is not bound by any particular biological mechanism, it is believed that the removal of the ear-leaf after pollination enables the strong sink effect of developing kernels to remain intact and wherein the ears may emit a signal triggering repartitioning such that assimilate from upper canopy leaves is exported down to developing kernels. For example, the defoliation of maize plants can occur from about 10 days to about 30 days after pollination or at any of day after pollination as disclosed herein above. The timely defoliation of the ear-leaves of a majority of maize plants approximately 10 days after pollination is generally preferable to ensure plants are at the end of the lag phase, wherein the kernel cell number is established. In one embodiment of the invention, the defoliation does not occur later than about 30 days after pollination, to ensure complete grain filling through maturity of the plant. Preferably, defoliation occurs at about 10, 11, 12, 13, 14, 15, 16, 17, 18, 19, 20, 21, 22, 23, 24, 25, 26, 27, 28, 29 or 30 days after pollination.

It is believed that the repartitioning of assimilate from the upper canopy leaves allows developing kernels to fill to a greater extent than do those on control plants, whose primary source leaf remains in an inferior light environment. Such sink/source responses to increase kernel mass are only observed at high plant densities. It is expected that at lower plant densities, there is sufficient penetration of solar radiation into the canopy such that the female inflorescence does not send a signal to remaining leaves to redirect or enhance photoassimilatory output.

Accordingly, it is believed the methods of the invention result in exportation of assimilate in defoliated plants to promote the filling of kernels to a greater extent than those of intact control plants in higher plant populations. Notably, the increase in average kernel mass is not associated with any corresponding decrease in kernel number. Accordingly, in a preferred embodiment of the invention, the increase in average kernel mass of ear-leaf-defoliated plants growing at high densities is further correlated with a corresponding increase in grain yields.

C. Increased Biomass Yields

In another embodiment of the invention, removing the primary-source leaf of a majority of plants growing at high densities will result in increased biomass in comparison to biomass of plants grown in the same high density with an intact primary-source leaf. The defoliated plants of the present invention demonstrate increased grain weight and are expected to demonstrate increased biomass, particularly increased grain or seed biomass, when compared to plants grown at the same density and for which the primary source leaf was not removed. This resultant increase in biomass after defoliation is contrary to the general principle that defoliation causes a negative effect on biomass. The expected increase in biomass resulting from the removal of primary-source leaves is a highly unexpected result. One skilled in the art would expect the defoliation methods of the present invention to cause a decrease in the plant's above-ground biomass and therefore a decrease in the overall biomass. According to the embodiments of the invention, the increase in grain biomass achieved exceeds the decrease in foliar biomass caused by defoliation of the primary-source leaf.

While the invention does not depend on a particular biological mechanism, it is believed that the increased biomass yields result from the timely removal of the primary-source leaf, directing photoassimilate from other leaves in the canopy. The result of the redirection of photoassimilate is that such photoassimilate is obtained from other leaves in the upper part of the canopy with superior light quantity and quality. The defoliation of plants according to a preferred embodiment of the present invention may occur approximately 10 days after pollination. Accordingly, it is believed the methods of the invention result in exportation of assimilate in defoliated plants to promote the increase in above-ground biomass of the primary-source-leaf-defoliated plants of the present invention and therefore increase the biomass yield.

D. Increased Photosynthetic Effects

In another preferred embodiment, defoliated plants experience a response and compensatory increase in photosynthetic rates due to the removal of the primary-source leaf from a majority of the plants grown in high density populations. It is believed that the increase in photosynthetic rates is the plant's compensation for the missing primary-source leaf. The compensatory increase in photosynthetic rate of remaining source leaves, due to the loss of the primary-source leaf, is a compensatory response, in addition to the redirection of assimilate, in defoliated plants in high density populations. It is believed that the increase in photosynthetic rates due to the removal of a plant's primary-source leaf further result in the demonstrated increase in plant yield and biomass yield generated from the methods of the invention.

Embodiments of the present invention are further defined in the following non-limiting Example. It should be understood that the Example, while indicating certain embodiments of the invention, is given by way of illustration only. From the above discussion and the Example, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

EXAMPLE

Hybrid maize plants were grown in Johnston, Iowa in replicated field trials at varying plant populations: 27,000; 45,000; 63,000 and 81,000 plants per acre. The maize hybrid grown was Pioneer 3245. At approximately 10 days after pollination (before grain fill), the ear-leaf from all plants in a four-row plot was removed to effectuate defoliation. The ear-leaf of all control plants in an adjacent four-row plot was left intact.

At the end of the growing season, plant ears were hand harvested from the center two rows in each plot and the yield components were analyzed. The grain yield of intact plants is consistent with the industry standard yield data across the tested populations, with a typical curvilinear response and an inflection point around 50,000 to 60,000 plants per acre. (FIG. 1). In comparison, the response curve for ear-leaf-defoliated plants demonstrates an inflection point that has shifted to 70,000 to 80,000 plants per acre, with increased yield over control plants observed at 81,000 plants per acre.

Figure 2:
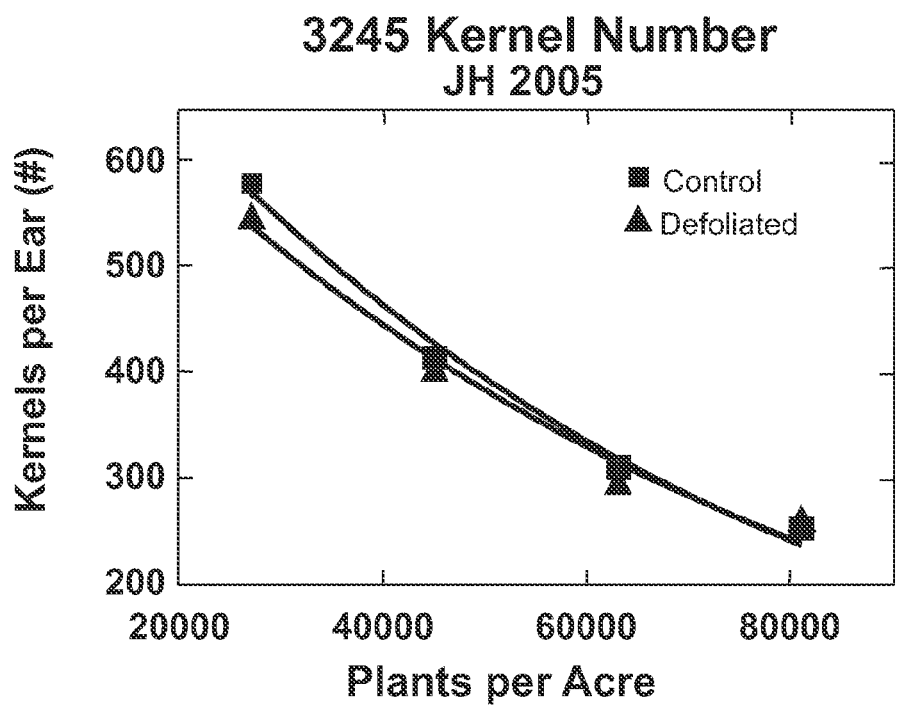
FIG. 2 shows kernels per ear of ear-leaf-defoliated maize plants and kernels per ear of intact controls across a range of plant populations.
Figure 3:
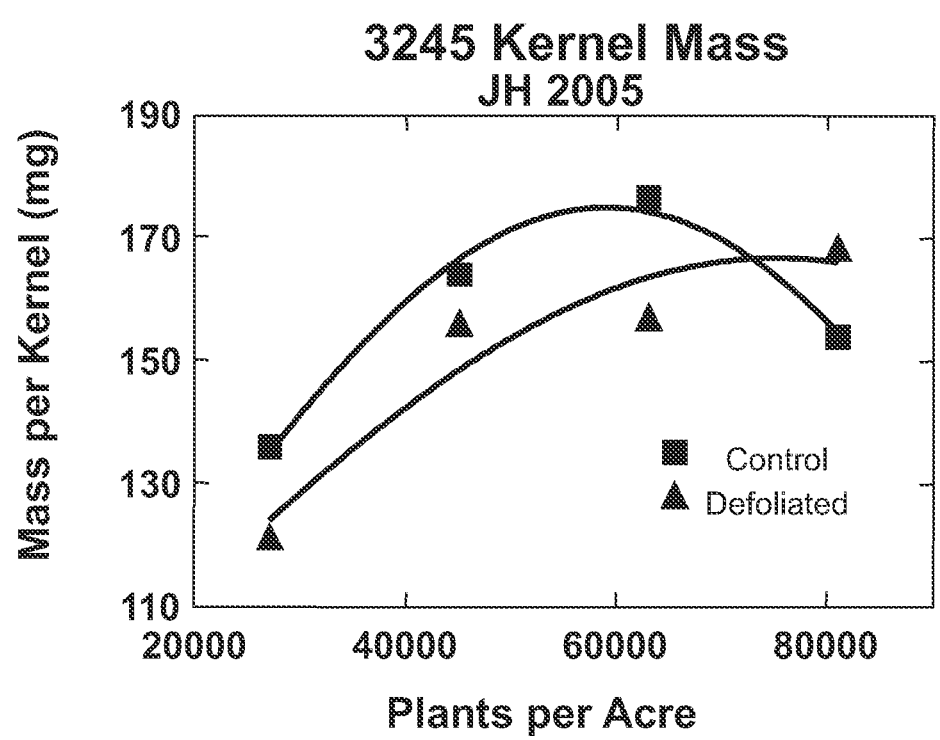
FIG. 3 shows mass per kernel of ear-leaf-defoliated maize plants and mass per kernel of intact controls across a range of plant populations.

The increased yield in the high plant population group shown in FIG. 1 was not correlated with a change in kernel number. (FIG. 2). However, the increased yield was strongly correlated with a change in average mass per kernel. (FIG. 3).

Although the invention has described herein primarily with respect to the use of maize plants, the methods of the invention are not limited to maize plants and can employ numerous other plants including, but not limited to, monocots such as grasses. Such grasses include, for example, wheat, rice, oats, millet, barley, rye, and sorghum.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claims.

That which is claimed:

1. A method of increasing an average photosynthetic rate of a plurality of plants, comprising the steps of:
   (a) growing a plurality of plants at a high density; and
   (b) defoliating at least one primary-source leaf from a majority of said plurality of plants after pollination occurs;
   wherein average photosynthetic rate of the defoliated plants is increased relative to average photosynthetic rate of control plants.

2. The method of claim 1, wherein said plants are maize.

3. The method according to claim 2, wherein said high density is at least 70,000 plants per acre.

4. The method according to claim 2, wherein said high density is at least 72,000 plants per acre.

5. The method according to claim 2, wherein said high density is at least 80,000 plants per acre.

6. The method according to claim 2, wherein said primary-source leaf is defoliated at about ten days after pollination of said plants.

7. The method according to claim 1, wherein said primary-source leaf is defoliated by mechanical means.

8. The method according to claim 1, wherein said primary-source leaf is defoliated by manual means.

9. The method according to claim 1, wherein said primary-source leaf is defoliated by chemical means.

10. The method according to claim 1, wherein said primary-source leaf is defoliated by any combination of mechanical, chemical and manual means.

11. The method of claim 1, wherein grain yield per unit area is increased when compared to grain yield per unit area of control plants.

12. The method of claim 1, wherein average mass per seed is increased when compared to average mass per seed of control plants.

13. A method of increasing grain yield under drought stress, comprising the steps of:
    (a) growing a plurality of plants at a high density under drought stress; and
    (b) defoliating at least one primary-source leaf from a majority of said plurality of plants after pollination occurs;
    wherein grain yield of said defoliated plants is increased relative to grain yield of control plants under drought stress.

14. The method of claim 13 wherein said increased grain yield results from increased average mass per kernel.

15. The method of claim 13, wherein said plants are maize.

16. The method according to claim 15, wherein said high density is at least 70,000 plants per acre.

17. The method according to claim 15, wherein said high density is at least 72,000 plants per acre.

18. The method according to claim 15, wherein said high density is at least 80,000 plants per acre.

19. The method according to claim 15, wherein said primary-source leaf is defoliated at about ten days after pollination of said plants.

20. The method according to claim 13, wherein said primary-source leaf is defoliated by one or more of mechanical, chemical and manual means.

* * * * *